July 27, 1965

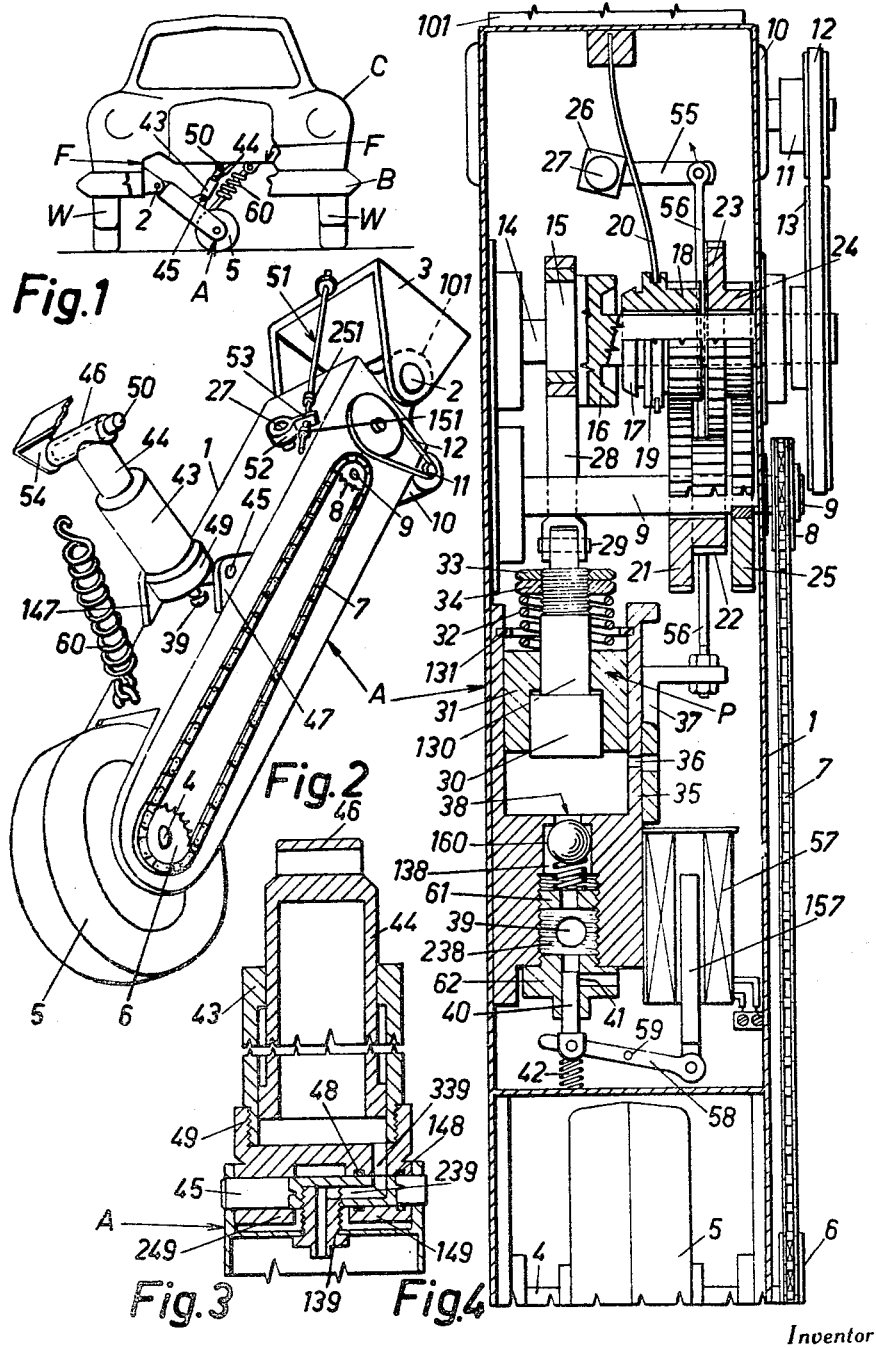

I. SENZANI 3,196,969

MOTOR CAR PARKING APPARATUS

Filed Dec. 13, 1963

Inventor
Iro Senzani
By Alminia V Smiley
Attorney

United States Patent Office 3,196,969
Patented July 27, 1965

3,196,969
MOTOR CAR PARKING APPARATUS
Iro Senzani, 13–15 Viale Risorgimento, Faenza, Italy
Filed Dec. 13, 1963, Ser. No. 330,502
Claims priority, application Italy, Dec. 14, 1962,
25,006/62
8 Claims. (Cl. 180—1)

This invention relates to self-propelled apparatus to be fitted under one end of motor cars and serving for shifting said one end laterally with respect to the normal direction of the vehicle, by causing the vehicle to pivot about the wheels at the opposite end.

Apparatus of this kind, serving particularly for assisting in parking motor cars in a restricted space are known, but they are so constructed as to usually necessitate important modifications of the corresponding end of the car frame and adjoining parts.

One of the objects of the invention is to construct an apparatus of the kind above-referred to, which comprises a lifting arm and a self-propelled parking wheel at the end thereof, which is of very compact construction and which may be fitted under one end of a car frame or body without necessity of modifying the corresponding car frame or body end.

Another object of the invention is to provide an apparatus adapted to be used for assisting in parking the vehicle to which it is fitted by employing as power source the usual car battery.

Other objects and advantages will be apparent from the following specification of a preferred embodiment of apparatus which substantially comprises a hollow lifting arm to be hinged under a motor car frame or body and in which the arm proper is made as tightly closed casing carrying a reversible electric motor to be fed by the car battery and in which there are housed hydraulic power means for operating a hydraulic cylinder hinged at the exterior of the casing and a corresponding hydraulic piston hinged under the car frame in such a manner as to swing said lifting arm downwardly; the casing also containing a clutch and a step-down gear for operating the parking wheel in either direction, a transmission for revolving the said parking wheel, when same has been lowered into contact with the ground and the car wheels on the corresponding end have been lifted by said arm off the ground.

The invention will be clearly understood by the following specification, made with reference to the accompanying drawing in which:

FIGURE 1 is a diagrammatical front elevation of a motor car provided at its front end with a parking apparatus according to the invention;

FIGURE 2 is a perspective view of the said apparatus with the attachment means to the car body or frame;

FIGURE 3 is an enlarged axial section through the hydraulic cylinder and piston employed for lowering and lifting the lifting arm of said apparatus by swinging same under the car body or frame;

FIGURE 4 is an enlarged longitudinal section through the car-lifting and shifting arm of the apparatus and shows the means for hydraulically swinging same and for power-driving the parking wheel, mounted at its free end.

Figure 5:
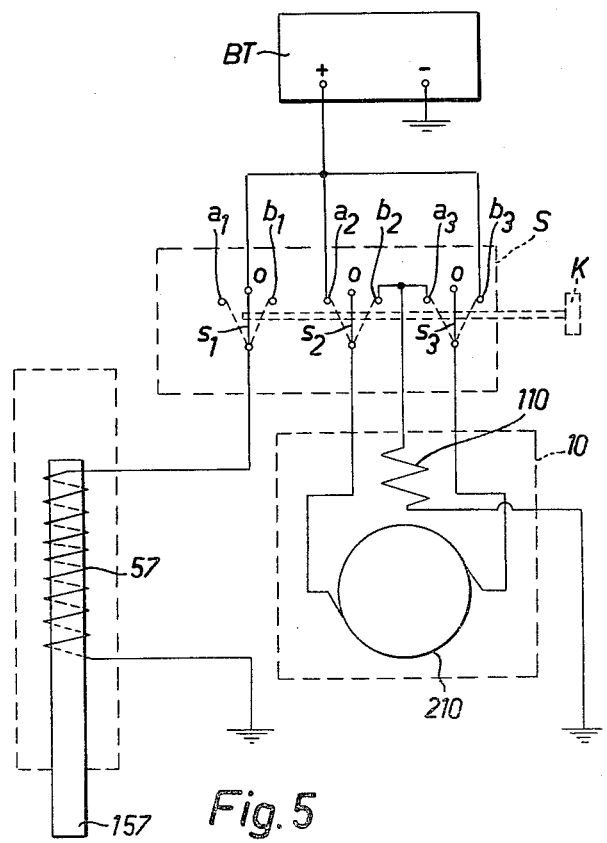
FIGURE 5 is a schematic diagram of the electrical circuit.

The basic idea of the invention, as set out in the preamble, will be better understood with reference to FIGURE 1 of the drawing.

From this figure it may be seen that the apparatus in its whole, comprises a hollow arm A (which, consists of a tightly closed casing 1 containing the hydraulic fluid and the essential parts for operating the whole apparatus) hinged as at 2 to the car body or frame F, between a wheel pair W of the car C.

The arm A is provided at its free end with a power-driven parking wheel 5 mounted substantially at right angles to the car wheels W between which it is mounted. The arm A is further connected to the car frame F by means of a hydraulic cylinder 43 and piston 44, the hydraulic cylinder 43 being hinged to arm A intermediate its ends, as at 45, while the piston 44 is hinged under the car frame F as at 50. A pulling coil spring 60 is anchored between the arm A and the car frame F.

The operation of the thus summarily described device is as follow:

When the stopped car C must be parked in a comparatively limited space, the hydraulic power means are operated so as to swing arm A from its rest position (not shown), which is substantially horizontal and parallel to the bumper bar B to an inclined position, as shown, in which the parking wheel 5 bears on the ground and lifts the corresponding car wheels W. When the car wheels W are sufficiently clear of the ground, the operation of the hydraulic power means is stopped, the communication between the cylinder 43 and casing 1 is intercepted and, the parking wheel 5 is power-revolved in either direction so as to turn the car C about its wheels at the opposite car end (the rear wheels, in the case as shown) for a sufficient angle.

This done, the operation of the parking wheel 5 is stopped and the valves in the hydraulic circuit are opened so as to permit the fluid to flow out of the hydraulic cylinder 43, so that the arm A, under the pull of spring 60, may be swung again to its horizontal or rest position.

One preferred embodiment of the means for effecting the above-described operation will be described hereinafter with reference to FIGURES 2 to 4 of the accompanying drawings.

These means substantially comprise:
(I) The driving means.
(II) The hydraulic means for positively swinging the arm 1 downwardly and lifting the car wheels W clear of the ground.
(III) The transmission for driving the parking wheel 5.

(I) *The driving means*

The driving means comprising a reversible electric motor 10 mounted upon the arm casing 1 near its hinged end and connected through wires and a conventional polarity inverter switch (of known construction) to the car battery. The shaft of motor 10 is provided with a pulley 11 (see FIGURE 4) which drive through belt 12 a larger pulley 13 fitted at the end of a control shaft 14. The shaft 14 carries an eccentric 15 which is encircled by a collar integral of a connecting rod 28 hinged as at 29 to the end of the rod of a hydraulic piston 30.

Upon the control shaft 14 there is also fastened a clutch member 16 to which there may be clutched a complementary clutch member 17 integral of a cylindrical pinion 18, both idly and axially shiftable upon said shaft 14. The clutch member 17 is urged into clutching position by a leaf spring 20 anchored by one end to the arm casing and engaging by its free end an annular groove 19 formed in a part integral of clutch member 17. Said clutch member may be shifted to declutching position (as shown in FIGURE 4) by a cam 26 keyed on a shift 27 which may be rotated by a small angle from the exterior by suitable means such as a rod 51 anchored to the vehicle frame and acting through abutment nuts 151 and 251 upon an arm 53 projecting from a bushing 52 fastened at the end of said shaft 27. In practice, when arm A is swung downwardly or upwardly said arm 53, angularly shifted in either direction and the shiftable clutch member 17 is clutched to or declutched from the fixed cluth member 16.

(II) *The hydraulic means*

The hydraulic power means are all enclosed in the arm casing 1 and comprise a hydraulic pump, the piston 30 of which is reciprocated in a cylindrical chamber by the connecting rod 28 connected to the piston rod 130 which passes with a tight fit through an axial bore of said cylindrical chamber. In the embodiment as shown, the cylindrical chamber is formed in the end of a larger coaxial valve and compensating piston 31 slidably mounted in a cylinder 35 of which it closes the top end, the top position of said larger piston 31 being determined by a split abutment ring 131 inserted in an annular groove of the cylinder 35. The pistons 30 and 31 are further urged the one against the other by a coil spring 32 threaded upon the piston rod 130 and bearing wtih one end against abutment members 34–33 and with the other end against the top of the larger piston 31.

The cylinder 35 has a side inlet port 36, which permits the communication between the interior of the cylinder 35 and the interior of the arm casing 1, may be closed from the interior by the piston 31 when it is shifted downwardly. Casing 1 is filled with hydraulic fluid (usually oil) and constitutes the reservoir of said fluid. Said port 36 may be also closed by a slide valve 37 connected by means of a control rod 56 to a lever arm 55 keyed upon the same shaft 27 upon which the clutch control cam 26 is keyed, the arrangement being such that the valve 37 is opened whenever the clutch member 17 is declutched and is closed in clutched position.

The cylinder 35 is further provided with a bottom outlet port 38 opening in a counterbored duct section 138 which ends with a larger screw-threaded duct section 238. In the duct section 138 a non-return valve 160 is mounted which is pressed by a spring against the protruding edge of port 38, the said spring being retained by a screw-threaded washer 61. The enlarged duct section or chamber 238 is closed at its end by means of an axially bored plug 62 provided with a vent port 41 which, when the device is operating is closed by a piston valve 40 hingedly fitted at one end of a two-armed lever 58 fulcrumed at 59 and carrying at its opposite end a magnetic core 157 slidably mounted in the axial bore of a magnet coil 57 which may be connected to the car battery. When the coil 57 is de-energized a spring 42 keeps piston valve 40 in closed position (as shown) and permits the building up of a hydraulic pressure into the cylinder 43. When the coil 57 is energized, the core 157 is sucked into coil 57 and through lever 58 pulls valve 40 so as to open the vent port 41.

The duct section 238 is provided with a side port 39 in which a nipple 139 is fitted which opens into a duct section 239 bored in the fixed pivot 45 fastened to a pair of lugs 47 (see FIGURE 2) protruding from the casing 1. To this pivot 45 the cup-shaped bottom section 49 of the hydraulic power cylinder is pivotally connected by means of a pair of bushings 149, 249 integral of the cylinder bottom, the oil tightness between the bushings and pivot 45 being ensured packing rings 48–148. Upon the said cylinder bottom section 49 the hydraulic power cylinder 43 is screwed. The cylinder bottom section 49 is provided with a duct section 339 constituting the extension of the outlet of the duct section 239 bored in pivot 45. Thus the fluid under pressure in chamber 239 may freely flow into the hydraulic power cylinder 43 when the piston 30 is operated and the port 41 is closed by valve 40, or may be discharged from said power cylinder into the arm casing when the port 41 is open.

As clearly shown in FIGURE 2 the power piston 44 ends with a bushing 46 fitted upon the fixed pivot 50 fastened to an angle iron 54 which, in its turn, may be fastened to the car frame F.

(III) *The parking wheel drive*

The parking wheel 5 is fastened upon a shaft 4 rotatably mounted between a pair of lugs projecting from the free end of casing 1 and may be positively driven, when the car wheels W at the corresponding end are lifted off the ground. In order to do this, it is sufficient to engage the clutch members 16 and 17 by turning cam shaft 27 with cam 20 so as to set spring 26 free to urge clutch member 17 against clutch member 16.

At the same time, when shaft 27 is so turned, arm 55 keyed thereon shifts, through rod 56, the slide valve 37 so as to close the inlet port 36 of cylinder 35, so that the piston 30 can no longer suck fluid from the arm interior and thus it runs idle.

The clutch member 17 is integral of a long cylindrical pinion 18 which is in mesh with a gear 21 in every position of the clutch member 17. Gear 21 is integral of a smaller gear 22 and is idly mounted on a counter-shaft 9 parallel to shaft 14. Gear 22 meshes with a larger gear 23 integral of a smaller gear 24 and idly mounted on shaft 14. Gear 24, in its turn, meshes with a larger gear 25 fastened on countershaft 9 one end of which projects outside of the casing of arm 1, where it carries a sprocket wheel 8 which is connected by chain 7 to a sprocket wheel 6 fastened to the parking wheel shaft 4.

Thus, when the clutch members 16 and 17 are engaged and the motor 10 is running, the wheel parking 5 is positively driven through speed reduction gear train 18, 21, 22, 23, 24, 25 and chain drive 8, 7, 6.

The operation of the apparatus has been summarily described with reference to FIGURE 1.

In practice, when it is desired to employ the apparatus for parking a car in a limited space, it is sufficient to operate the motor 10 in the desired direction. In fact, as the arm A is in rest position, by operating the motor 10 the pump piston 30 is operated. At the beginning of the operation, the piston 30 is reciprocated together with the larger piston 31, to which it is elastically coupled through spring 32 and, in the suction strokes, both draw liquid from arm casing 1 through the uncovered port 36. In the subsequent pressure strokes, piston 31 closes the interior port 36 and piston 30 pumps the liquid through valved port 38 into the power cylinder 43. When however the pressure of the liquid sucked through port 36 and forced through port 38 exceeds a certain limit, piston 31 is forced back by said fluid pressure so that it does no longer completely close port 36 and thus at least a part of the fluid pumped by piston 30 flows back into casing 1. The fluid under pressure forced into the power cylinder 43 promotes, as said, the downward swinging of arm A until the parking wheel 5 bears on the ground and the arm A, by being further swung downwardly, lifts the car wheels W.

In this position, the abutment nut 151 on rod 51, by co-acting with lever arm 53, effects automatically the engagement of the clutch members 16 and 17 and completely closes suction port 36 by means of slide valve 37, so that piston 30 runs idle, while piston 31 functions as compensation piston, and is forced by the fluid under pressure pumped by the piston 30 in reverse direction with respect to the direction of piston 30. At the same time the parking wheel 50 is revolved in the desired direction, thus turning the car.

When the car has assumed the desired position, the motor 10 is stopped and the magnet coil 57 energized, so as to cause vent port 41 to be uncovered and the fluid to flow from the power cylinder 43 into the casing of arm 1, thus causing the arm 1 to be swung upwardly to rest position, under the action first of the car weight and then of the spring 60.

In order to get the car out of its parking position, the above operations are repeated, but the motor 10 is operated in reverse direction, until the car assumes a position in which it may be backed out in the usual manner.

(IV) The electric circuitry

The electric circuitry controlling the just described apparatus is shown in FIG. 5. It comprises a switch S controlling the operation of the motor 10 and electro-operated valve 40, as well as the electrical connections between switch S and motor 10, solenoid 57 of valve 40, and the car battery BT. The switch S may be formed by any known type of three-section, three-poles switch, comprising three banks of fixed contacts $a_1$, O, $b_1$; $a_2$, O, $b_2$ and $a_3$, O, $b_3$, and three coacting movable contacts $S_1$, $S_2$ and $S_3$, the latter assembled for instance on suitable disks made of insulating material, and movable through three switching positions with respect to the fixed contact banks. The switching movement of the movable contacts is controlled through a suitable controlling knob K. The switch S may be assembled on the front panel of the car, in a well known manner. The positive terminal of the battery BT is connected through suitable leads to the fixed contact O of the first contact bank, as well as to the fixed contacts $a_2$ and $b_3$ of the second and third contact banks, respectively. The negative terminal of the battery is grounded, for instance by connection to the car frame. Fixed contacts $a_1$ and $b_1$ of the first contacts bank are insulated. The movable contact $S_1$ of the said first contact bank is connected through a suitable lead to one terminal of the solenoid winding 57, the other terminal of said winding being grounded. The movable contacts $S_2$ and $S_3$ of the two remaining contact banks of switch S are each connected through suitable leads to one of the terminals (brushes) of the armature circuit 210 of the D.C. series motor 10. The fixed contacts $b_2$ and $a_3$ of said banks are connected together and to one terminal of the field circuit 110 of motor 10, the second terminal of said field circuit being grounded. The O contacts of the said two fixed contact banks are insulated.

From the above, the operation of the described circuit is apparent. Whenever the movable contacts $S_1$, $S_2$ and $S_3$ are switched to rest position (that is onto contacts O of the three banks of fixed contacts) motor 10 is insulated and solenoid 57 is energized, thus sucking core 157 and pulling valve 40 through lever 58 (FIG. 4) so as to open the vent port 41.

By switching the movable contacts $S_1$, $S_2$ and $S_3$ on contacts $a_1$, $a_2$ and $a_3$, the following occurs:

(1) Solenoid 57 is de-energized, and thus spring 42 (FIG. 4) pushes valve 40 in position to close vent port 41.

(2) Motor 10 is energized, and current from battery BT flows in one direction through contacts $a_2$ and $S_2$, the armature winding 210, contacts $S_3$ and $a_3$, the field winding 110 to ground. Motor 10 thus rotates in one direction, for example, in clockwise direction.

By switching movable contacts $S_1$, $S_2$ and $S_3$ on contacts $b_1$, $b_2$ and $b_3$, the solenoid is again de-energized. Current from battery is flowing through contacts $b_3$, $S_3$ through the armature winding 210, through contacts $S_2$ and $b_2$, through field winding 110 and to ground. It will be therefore seen that the flow direction of the current through armature winding 210 of motor 10 is reversed in said last switching position, while flow through field winding 110 is unchanged. Therefore, motor 10 reverses its direction of rotation.

The said reversal of the rotation direction of the motor 10 does not affect the operation of the piston of the hydraulic pump P, while it affects the direction of transversal travel of the vehicle, taking place after completion of the lifting of the front of the car by means of the lifting arm, when the motor is automatically disengaged from the pump and coupled to the parking wheel 5, as fully described previously.

I claim:

1. A parking apparatus composed of a hollow lifting arm hinged at one end and provided at its opposite end with a parking wheel and provided with a reversible electric motor, a hydraulic power piston for swinging said arm downwardly and a transmission for driving said parking wheel from said motor and means for clutching automatically the transmission of the power to the parking wheel when the lifting arm has reached a certain angular position and means for pulling said arm to rest position when the motor is stopped and the hydraulic means are rendered inoperative.

2. A parking apparatus comprising a lifting arm hinged at its upper end, a parking wheel mounted on the lower and of said arm, a reversible electric motor mounted on said arm, a pressure fluid power means for swinging said arm downwardly from an upper rest position, a transmission for driving said parking wheel from said motor, means for automatically clutching the transmission to the parking wheel when the lifting arm has reached a certain angular lowered position, and means for returning said arm to its rest position when the motor is stopped and the pressure fluid power means are rendered inoperative.

3. A parking apparatus to be fitted under one end of a motor car havnig a body, frame and an electric battery, said apparatus comprising a lifting arm, a parking wheel journaled at one end of said arm, means at the other end of said arm for pivotally mounting said arm under a car body between a pair of wheels and in a rest position, a direct current electric motor mounted on said hollow arm, means for electrically and reversibly connecting said motor to the car battery, a pressure fluid pump mounted on said arm, a pressure fluid power cylinder and piston pivotally secured to said arm and having pivotal means for securement to the car frame whereby operation of said power cylinder will swing the lift arm through a selected arc to an operating position, conduit means connecting said cylinder to said pump, electrically controlled valve means in said conduit between said cylinder and the pump, a speed reduction transmission including a clutch connecting said motor to said parking wheel, means coupling said motor to drive said pump, automatically operated control means for idling said pump and for engaging said clutch to couple said motor to said parking wheel when the lifting arm has been moved by said power cylinder from its rest to its operating position, and spring means for urging said arm toward its rest position against the action of said power cylinder.

4. A parking apparatus according to claim 3, wherein said lifting arm is hollow and forms a fluid-tight casing acting as a reservoir for a pressure fluid, said pump having an inlet port communicating with the interior of the arm, and said control means includes a valve movable to close said inlet port thereby idling said pump.

5. A parking apparatus according to claim 4, wherein said pump and said speed reduction transmission are mounted within said hollow arm, and said electrically controlled valve means allowing the discharge of pressure fluid from said power cylinder into said hollow arm to permit said spring means to swing the arm back to rest position.

6. A parking apparatus to be fitted under one end of a body, or frame, of a motor car, equipped with an electric battery, for lifting the car wheels at the end of the stopped car to which the said device is fitted and turning the car about the wheels at the opposite end, said device comprising a hollow casing-like arm serving as an hydraulic fluid reservoir and provided at one end with a parking wheel adapted to bear and roll on the ground and at the opposite end with means for pivotally mounting the arm under a car body between a wheel pair, a reversible electric motor mounted on said hollow arm and connectable to said car battery in a conventional reversible manner, an hydraulic power cylinder and piston hinged to said arm and hingeable to the car frame and adapted to swing said arm from a rest position, in which the said parking wheel is clear of the ground, to an operating position, in which said parking wheel bears on the ground and the arm lifts the car wheels between which it is fitted, an hydraulic pump and valve means in said arm for operating said hydraulic cylinder and piston, driving connections from said motor to said pump and said parking wheel including a clutch, automatic means for idling said pump and simultaneously engaging the clutch of the driving means for operating said parking wheel when the said arm is swung down to its operating position, means for allowing the discharge of the hydraulic fluid from said hydraulic power cylinder into said hollow arm when the motor is stopped, and spring means for swinging said arm back to its rest position when the said means for allowing the discharge of the fluid from the power cylinder are operative.

7. A parking apparatus according to claim 6, in which said driving connections from the electric motor include speed reduction gearing having a drive shaft, eccentric means keyed on said drive shaft, a connecting rod operatively connected to said eccentric means and to a reciprocating piston forming part of the said hydraulic pump, said hydraulic pump comprising a cylinder, an inlet port opening to the interior of said hollow arm, means for closing said inlet port, an outlet port provided with a non-return valve, means for connecting said outlet port with the said hydraulic power cylinder, said means for allowing the discharge of fluid from the power cylinder including a vent port beyond said outlet port and valve means for closing and opening said vent port.

8. A parking apparatus according to claim 6 in which said driving connections from the electric motor includes speed reduction gearing having a drive shaft, eccentric means keyed on said shaft, a connecting rod operatively connected to said eccentric means and to a reciprocating piston forming part of the said hydraulic pump, said hydraulic pump comprising a cylinder, an inlet port opening to the interior of said hollow arm, means for closing said inlet port, an outlet port provided with a non-return valve, means for connecting said outlet port with the said hydraulic power cylinder, a vent port past said outlet port, a valve for closing and opening said vent port, said clutch comprising a first clutch member keyed on said drive shaft, a second clutch member and a pinion integral therewith slidably mounted on said drive shaft, a countershaft, said speed reduction gearing being mounted on said drive and countershafts and driving at reduced speed said countershaft when said slideable clutch member is clutched to said first clutch member, said driving connection including drive means extending between said countershaft and said parking wheel, said automatic means for idling the pump and simultaneously engaging the clutch including a connected valve means for closing the inlet port of said hydraulic pump, and said means for allowing discharge of fluid from the hydraulic cylinder including means for opening said valve for the vent port of the hydraulic pump.

References Cited by the Examiner

UNITED STATES PATENTS

| | | | |
|---|---|---|---|
| 2,819,766 | 1/58 | Bisceglic | 180—1 |
| 2,983,327 | 5/61 | Hult | 180—1 |
| 3,003,571 | 10/61 | Ash | 180—1 |

FOREIGN PATENTS

| | | |
|---|---|---|
| 1,023,324 | 12/52 | France. |
| 1,141,902 | 12/62 | Germany. |

BENJAMIN HERSH, *Primary Examiner.*

A. HARRY LEVY, *Examiner.*